United States Patent [19]

Aimura

[11] Patent Number: 5,021,720
[45] Date of Patent: Jun. 4, 1991

[54] DISPLAY APPARATUS OF THE CATHODE RAY TUBE TYPE

[75] Inventor: Harutsugu Aimura, Tokyo, Japan

[73] Assignee: Canon Kabushiki Kaisha, Tokyo, Japan

[21] Appl. No.: 394,142

[22] Filed: Aug. 16, 1989

Related U.S. Application Data

[63] Continuation of Ser. No. 912,381, Sep. 26, 1986, abandoned.

[30] Foreign Application Priority Data

Oct. 1, 1985 [JP] Japan ................... 60-216252

[51] Int. Cl.⁵ .............................................. H01J 29/56
[52] U.S. Cl. .................................... 315/370; 315/10
[58] Field of Search .............. 315/10, 370, 8; 358/69, 358/148, 10; 340/727

[56] References Cited

U.S. PATENT DOCUMENTS 4,314,179 2/1982 Tooyama et al. .................... 358/69
4,542,377 9/1985 Hagen et al. ....................... 340/727

Primary Examiner—Theodore M. Blum
Attorney, Agent, or Firm—Fitzpatrick, Cella, Harper & Scinto

[57] ABSTRACT

A display apparatus of the CRT type displays information by use of a magnetic field. In this apparatus, a deviation amount of the image displayed on the CRT display screen from a reference position is detected by photo sensors arranged at the peripheral positions of the screen. The phase of the display information signal is adjusted for the vertical and horizontal sync signals regarding the CRT so that the display information can be displayed at the reference position on the screen on the basis of the detection information which is obtained from the photo sensors. Thus, the display information can be accurately displayed at the reference position on the CRT screen irrespective of whether the CRT screen is vertically or horizontally set without any influence of an electron beam by the deflecting coils of the display apparatus due to the earth's magnetic field or the like.

20 Claims, 3 Drawing Sheets

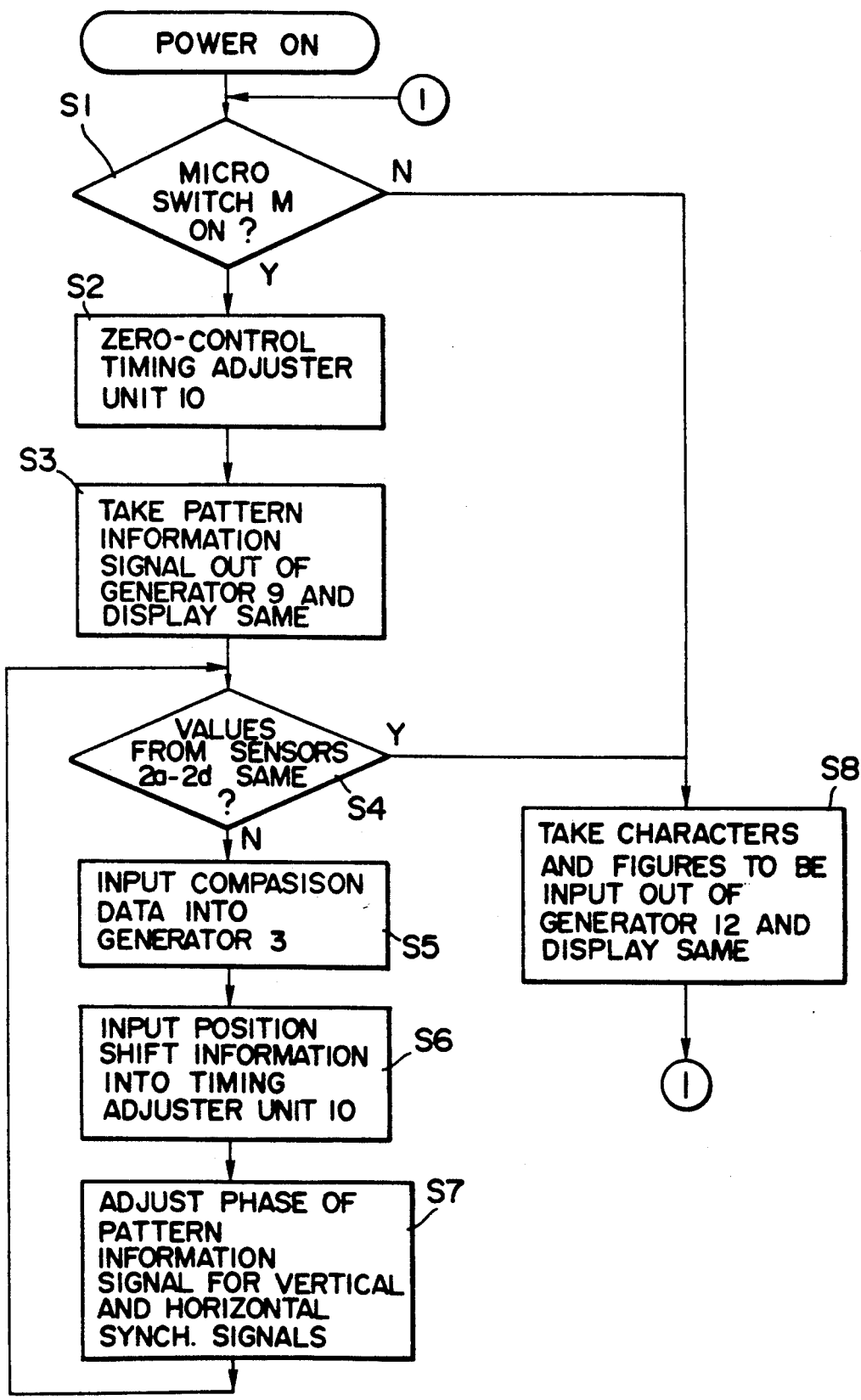

DISPLAY APPARATUS OF THE CATHODE RAY TUBE TYPE

This application is a continuation of application Ser. No. 912,381, filed Sept. 26, 1986, now abandoned.

BACKGROUND OF THE INVENTION

1. Field of the invention

The present invention relates to a display apparatus of the cathode ray tube type for displaying using a magnetic field and, more particularly, to a display apparatus which can display information at a reference position on the display screen of the cathode ray tube (hereinafter, abbreviated as the CRT).

The invention also relates to an apparatus for displaying using a magnetic field in which the setting position can be changed.

2. Related Background Art

Such a display apparatus is used in character processing apparatuses such as, for example, a word processor and the like, personal computers, and various kinds of measuring apparatuses. In this type of display apparatus, in general, an electron beam is deflected by a deflection magnetic field, thereby allowing characters, images, and the like to be displayed on the display screen of the CRT. In such a display apparatus, the deflecting coil for generating the deflecting magnetic field is positioned and attached in the throat portion of the CRT in a manner such that the display information is accurately displayed at a reference position, for example, at the center on the display screen of the CRT in consideration of the influence of the electron beam by the Earth's magnetic field.

Therefore, the above display apparatus can properly display a display pattern 13 at a reference position on a CRT 1 in the state in which the length in the lateral direction of the image plane is long as shown in, for example, FIG. 3A.

However, if a display pattern is displayed in the state in which the length in the vertical direction of the image plane is long as shown in FIG. 3B by the apparatus designed so as to display a display pattern in the state in which the length in the lateral direction of the image plane is long as shown in FIG. 3A in consideration of the influence by the Earth's magnetic field there is the following drawback. Namely, the deflecting magnetic field from the deflecting coil improperly acts on the electron beam, so that the display pattern 13 is displayed at a position deviated from the reference position on the screen of the CRT 1 and it is hard to see the display information. Further, in recent years, there is the tendency such that a number of graphic displays are used; therefore, such a drawback is more and more typical in the current situation in which it is required to freely change the vertical and lateral lengths of the image plane on the CRT.

SUMMARY OF THE INVENTION

It is an object of the present invention to solve the foregoing drawbacks and to provide a display apparatus of a cathode ray tube type in which even if the setting position of a CRT is changed, the display information can be accurately displayed at a reference position on the screen of the CRT.

Another object on the invention is to provide a display apparatus of the cathode ray tube type in which the change of the setting position of a CRT can be detected and the display information can be accurately displayed in accordance with the change of the CRT setting position.

BRIEF DESCRIPTION OF THE DRAWINGS

FIG. 4 is a flowchart for the overall operation based on the display control which is executed by a controller unit 8.

DETAILED DESCRIPTION OF THE EMBODIMENT

The present invention will now be described in detail hereinbelow with reference to the drawings.

Figure 1:
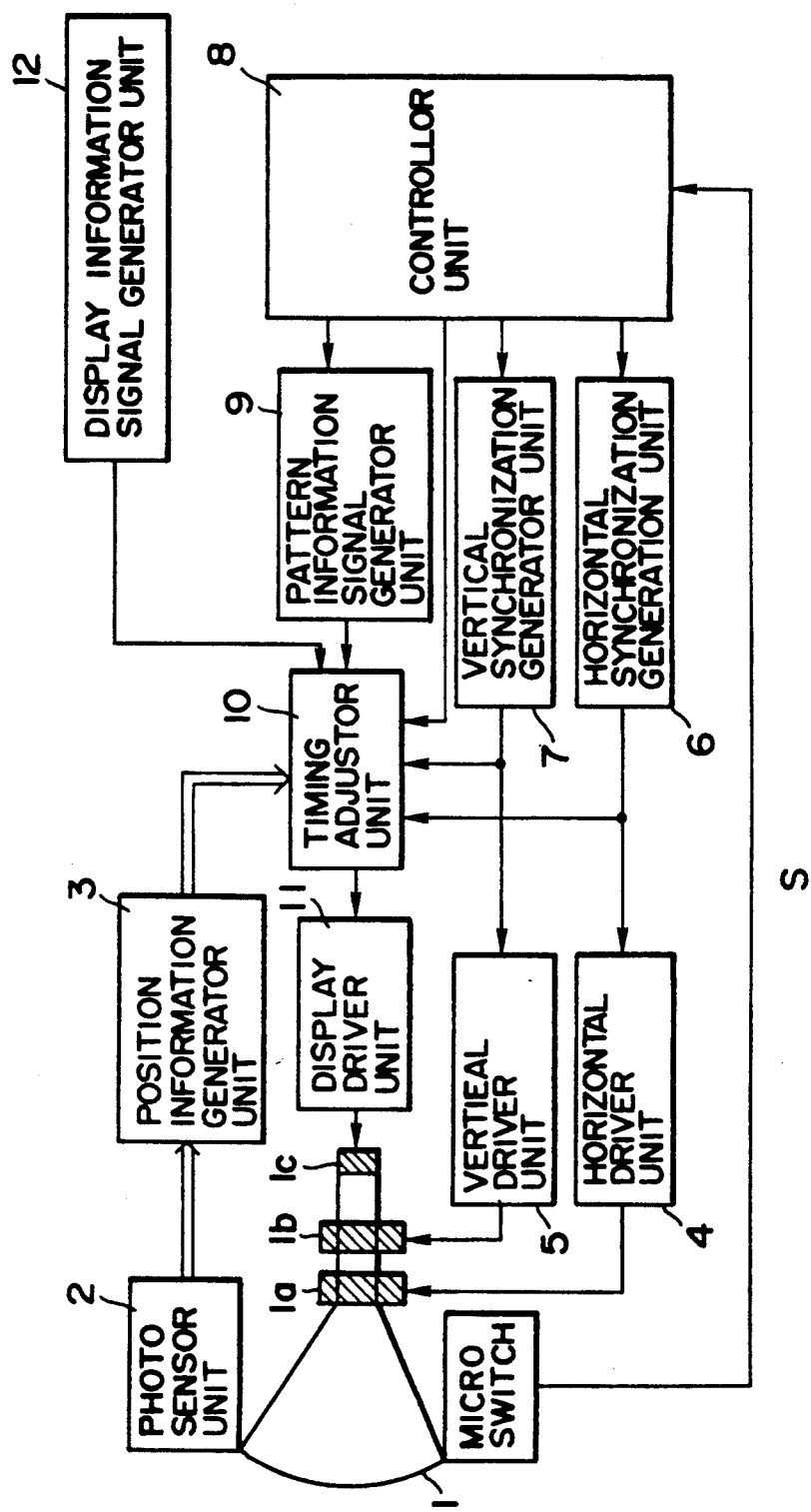
FIG. 1 is a block diagram showing an example of a circuit arrangement of a display apparatus of the cathode ray tube type of the present invention.

FIG. 1 shows an example of a circuit arrangement of a display apparatus of a cathode ray tube type according to the invention. In the diagram, reference numeral 1 denotes the ordinary CRT designed such that display information is displayed at a reference position on the screen in the state in which the length in the lateral direction of the image plane is long. Numeral 1a indicates a horizontal deflecting coil of the CRT 1; 1b is a vertical deflecting coil of the CRT 1; and 1c is an electron gun of the CRT 1. In this embodiment, the horizontal and vertical deflecting coils 1a and 1b are positioned and attached in the throat portion of the CRT 1 in a manner such that in the state in which the length in the lateral direction is long, the display image is displayed at the reference position, for example, at the central position on the screen of the CRT 1.

Figure 2A:
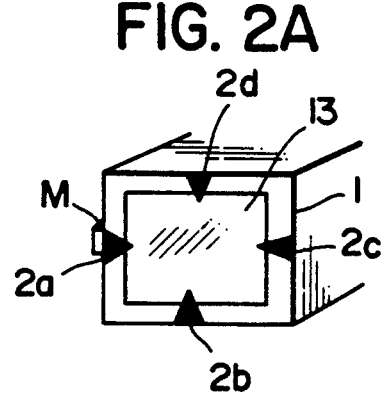
FIGS. 2A and 2B are partial perspective views showing normal display examples by the display apparatus of the cathode ray tube type of the invention.

Numeral 2 (2a to 2d) denotes a photo sensor unit consisting of four photo sensors fixed at predetermined positions such as the edge portions or the like of the display screen of the CRT 1 as shown in FIG. 2A. These photo sensors may be, for example, phototransistors having the same shape and the same photo sensing area. For example, each of the photo sensors 2a to 2d is arranged at the center of each of four sides constituting the peripheral edges of the rectangular screen of the CRT 1. In the case where the screen is set such that the length in the lateral direction is long as shown in FIG. 2A, the photo sensor 2a is arranged on the left side of the center of the screen when it is seen from this side; the photo sensor 2c is arranged on the right side; the photo sensor 2d is arranged on the upper side; and the photo sensor 2b is arranged on the lower side. When the external conditions such as the turn-on of the power supply of the display apparatus, the change in setting position thereof, or the like is changed, the photo sensors 2a to 2d receive light from the display pattern 13 which is displayed on the screen of the CRT 1 and is used to detect an amount of deviation of the display position. These sensors then output the signals corresponding to the amount of light received. Therefore, when the display pattern 13 is displayed at the reference position (center) on the screen of the CRT 1, the light reception amount of the photo sensors 2a to 2d are equalized, respectively.

A micro switch M is provided as necessary to detect whether the CRT 1 has been set in the laterally long or vertically long state. As shown in FIG. 2A, the micro switch M is attached to the left side portion of the CRT 1 when the screen of the CRT 1 is seen from this side. A detection signal S of the micro switch M is transmitted to a controller unit 8. When the CRT 1 is set in the laterally long state, the micro switch M is OFF. When the CRT is set in the vertically long state, on the contrary, the micro switch M is depressed onto the surface on which the CRT 1 is set, so that the switch M is ON.

A position information generator unit 3 receives the signals from the photo sensors 2a to 2d in the photo sensor unit 2 and outputs the ratios among the light reception amounts of the sensors 2a to 2d as the position information of the display pattern 13 displayed on the CRT 1. For example, as indicated by an alternate long and short dash line in FIG. 2B, if the pattern 13 indicative of the display frame is displayed at a position deviated from the center of the screen of the CRT 1, the light reception amounts of the sensors 2a to 2d will be the values in accordance with the deviation amounts, respectively. The display pattern 13 is rectangular as shown in, e.g., FIGS. 2A and 2B. A horizontal driver unit 4 is provided to supply a driving signal to the horizontal deflecting coil 1a. A vertical driver unit 5 is provided to supply a driving signal to the vertical deflecting coil 1b. A horizontal synchronization generator unit 6 is provided to output a horizontal sync signal to the horizontal driver unit 4. A vertical synchronization generator unit 7 is provided to output a vertical sync signal to the vertical driver unit 5.

The controller unit 8 has a microprocessor and a read only memory (ROM) in which the programs to be executed by the microprocessor are stored. The pattern information for the display pattern 13 is stored in a pattern information signal generator unit 9. The generator unit 9 outputs a pattern information signal for a predetermined time by a control signal from the controller unit 8.

When the controller unit 8 receives the detection signal S from the micro switch M provided as necessary or when the power supply of the display apparatus is turned on, the controller unit 8 controls output timing signals of the information signals for the display pattern 13 which are generated from the horizontal sync generator unit 6, vertical sync generator unit 7, and pattern information signal generator unit 9.

A timing adjuster unit 10 has means for storing a timing adjustment amount. The timing adjuster unit 10 receives the position information of the position information generator unit 3, horizontal sync signal of the horizontal sync generator unit 6, vertical sync signal of the vertical sync generator unit 7, and pattern information signal from the pattern information signal generator unit 9. The adjuster unit 10 then adjusts the phase of the pattern information signal for at least one of the horizontal and vertical sync signals in accordance with the position information and outputs the adjusted signal. The adjustment amount is stored and held in the memory means in the adjuster unit 10. When the power supply is turned on, the adjustment amount in the memory means is zero. This adjustment amount is updated (adjusted) by the signal from the position information generator unit 3 and is further set to zero by the controller unit 8. On the basis of the ratios among the light reception amounts of the sensors 2a to 2d as the position information from the position information generator unit 3, the timing adjuster unit 10 causes the pattern information signal to be delayed or advanced for at least one of the horizontal and vertical sync signals so that the light reception amounts are equalized, thereby eliminating the deviation of the display pattern 13 (electron beam), namely, the deviation from the center of the display pattern 13 on the display screen due to the influence by the Earth's magnetic field in accordance with the set state of the screen of the CRT 1. In this manner, the display pattern 13 is located at the central position as indicated by a solid line on the screen of the CRT 1 from the position indicated by an alternate long and short dash line in FIG. 2B.

A display driver unit 11 drives an electron beam so as to be irradiated onto the display screen of the CRT 1 in accordance with the display information which is output from the timing adjuster unit 10. Display information such as characters, figures, and the like to be displayed are output from the timing adjuster unit 10.

An example of the operation of the apparatus in FIG. 1 will now be described with reference to FIG. 4. First, the CRT 1 is set in the laterally long state as shown in FIG. 2A. FIG. 4 is a flowchart for the overall operation based on the display control which is executed by the controller unit 8. The control programs are stored in the ROM in the controller unit 8. First, when the power supply is turned on, it is recognized by the signals from the micro switch M that the CRT was set in the laterally long state (step S1). The pattern information signal generator unit 9 receives the control signal from the controller unit 8 and allows the signal indicative of the display pattern 13 to be transmitted to the timing adjuster unit 10. The adjustment amount in the timing adjuster unit 10 is zero and the deflecting coils 1a and 1b are positioned so as to accurately display when the CRT is set in the laterally long state. Therefore, the display pattern 13 is displayed at the accurate central position on the display screen of the CRT 1. In this case, since the photo sensors 2a to 2d light of substantially the same amount from the display pattern 13, the position information generator unit 3 outputs the position information representing that the display pattern 13 is displayed at a predetermined position. Thus, in response to this position information, the timing adjuster unit 10 continuously holds the state in which the pattern information signal is not corrected for the sync signals through the memory means.

After the display pattern 13, e.g., a frame was displayed for a predetermined time, &he display information is output to the timing adjuster unit 10 from the display information signal generator unit 12 in place of the pattern information. Thus, the display information is accurately displayed at the reference position on the screen of the CRT 1 similarly to the case of the display of the display pattern 13 (step S8). In the case where the CRT is set in the laterally long state, characters, figures, and the like may be directly displayed quickly.

Figure 2B:
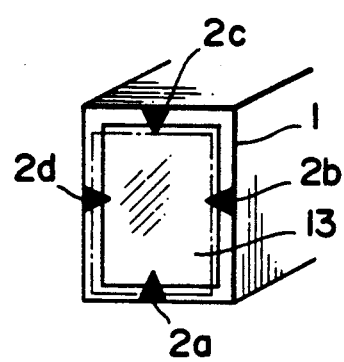
Figure 3A:
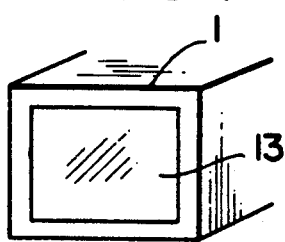
FIGS. 3A and 3B are partial perspective views showing display examples of a conventional display apparatus of the cathode ray tube type.
Figure 3B:
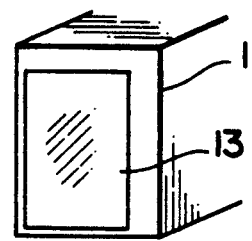

The case where the CRT 1 is set in the vertically long state as shown in FIG. 2B from the laterally long state in FIG. 2A and the photo sensor 2C is arranged at the top position will now be described. In this case, the micro switch M is depressed by the set surface and is turned on from the OFF state (step S1). In this case, the controller unit 8 receives the detection signal S indicative of the change of the setting direction of the CRT 1 from the micro switch M. Then, the controller unit 8 allows the signal from the pattern information signal generator unit 9 to be received by the timing adjuster unit 10 in place of the signal from the display information signal generator unit 12 and also controls the adjustment amount in the memory means of the timing adjuster unit 10 so as to become zero (step S2). The control signal is output to the generator unit 9 at the ordinary timing for the sync signals, namely, at the timing when there is no deviation between the phases of the horizontal and vertical sync signals. Due to this, the generator unit 9 outputs the pattern information for a predetermined time. The timing adjuster unit 10 displays the pattern information signal as the display pattern 13 on the screen of the CRT 1 through the display driver unit 11 without adjusting the sync signals (step S3). The display pattern 13 is influenced by the deflecting magnetic fields from the deflecting coils 1a and 1b adapted to properly act on the electron beam when the CRT is set in the laterally long state. Thus, the display pattern 13 is displayed at the position which is deviated to the left lower side from the reference position on the screen of the CRT 1 as indicated by an alternate long and short dash line in FIG. 2B. Because of the deviation, the light reception amounts of the photo sensors 2a and 2d are larger than those of the photo sensors 2b and 2c. The position information generator unit 3 supplies the ratios among the light reception amounts of the sensors 2a to 2d of the photo sensor unit 2 as the position information to the timing adjuster unit 10 (steps S4 to S6). On the basis of the information from the generator unit 3, the timing adjuster unit 10 adjusts the phase of the pattern information signal for only a predetermined time with respect to the vertical sync signal from the vertical sync generator unit 7 and the horizontal sync signal from the horizontal sync generator unit 6 in a manner such that the light reception amounts of the sensors 2a to 2d are equalized (step S7). The display pattern 13 is moved to the right upper side of the screen of the CRT 1 and displayed at the reference position as indicated by a solid line in FIG. 2B by the foregoing signal processes (step S8).

As described above, according to the invention, the deviation amount from the reference position of the image displayed on the screen of the CRT is detected by the detecting means attached at a plurality of positions of the peripheral portion of the screen of the CRT. The phase of the display information signal is adjusted for the sync signals on the basis of the detection information. Thus, the display information can be accurately displayed at the reference position on the CRT irrespective on the vertical and horizontal setting states of the screen of the CRT.

What is claimed is:

1. A display apparatus of a cathode ray tube comprising:
   detecting means for detecting an amount of deviation of an image displayed on a screen of a cathode ray tube from a reference position on said screen, with the deviation being due to the geomagnetism; and
   means for adjusting a phase of a signal of display information for a synchronization signal of the cathode ray tube so that the display information is displayed at the reference position on said screen on the basis of the result of the detection by said detecting means.

2. A display apparatus according to claim 1, wherein said deviation amount is an influence by a deflecting coil of said display apparatus.

3. A method for operating a display apparatus of a cathode ray tube type comprising the steps of:
   discriminating a setting of said display apparatus;
   selecting either a display screen adjustment mode or an ordinary mode on the basis of the result of the discriminating step
   generating a special display pattern;
   detecting a deviation amount of said display pattern from a reference position;
   adjusting a display timing on the basis of said deviation amount detected; and
   displaying a desired pattern at a proper position on the basis of said adjustment.

4. A method for operating a display apparatus according to claim 3, wherein said discriminating step includes providing a switch arranged on the outer side of said apparatus as said discriminating means.

5. A method for operating a display apparatus according to claim 3, wherein said steps of generating a includes generating a pattern indicative of a size which can be displayed.

6. A display apparatus of a cathode ray tube type comprising:
   horizontal and vertical deflecting coils arranged in a throat position of the display apparatus;
   display information generating means for generating display information indicative of a pattern to be displayed for normal use or special display information indicative of a special pattern to be displayed;
   vertical synchronization generating means, connected to a driver unit of said vertical deflecting coil, for generating a vertical synchronization signal for said display;
   horizontal synchronization generating means, connected to a driver unit of said horizontal deflecting coil for generating a horizontal synchronization signal for said display;
   detecting means for detecting a position in which the special patter is displayed; and
   control means for controlling, upon power on of said apparatus, said display information generating means and said detecting means such that the special display information is generated and the display position of the special pattern is detected and controlling, in accordance with the display position of the special pattern detected by said detecting means, the vertical and horizontal synchronization signals such that the display position of the special pattern is adjusted.

7. A display apparatus according to claim 6, wherein the special pattern is a pattern indicative of a display size.

8. A display apparatus according to claim 6, wherein said control means adjusts a phase of the special display information by shifting said phase for only a predetermined time for said vertical synchronization signal or said horizontal synchronization signal.

9. A display apparatus of a cathode ray tube type comprising:
   horizontal and vertical deflecting coils arranged in a throat position of the display apparatus;
   display information generating means for generating display information indicative of a pattern to be displayed for normal use or special display information indicative of a special pattern to be displayed;
   vertical synchronization generating means, connected to a driver unit of said vertical deflecting coil, for generating a vertical synchorization signal for said display;

horizontal synchronization generating means, connected to a driver unit of said horizontal deflecting coil for generating a horizontal synchronization signal for said display;

detecting means for detecting a position in which the special pattern is displayed;

control means for controlling, upon power on of said apparatus or change in state in which said apparatus is set, said display information generating means and said detecting means such that the special display information is generated and the display position of the special pattern is detected and controlling, in accordance with the display position of the special pattern detected by said detecting means, the vertical and horizontal synchronization signal such that the display position of the special pattern is adjusted, wherein said horizontal and vertical deflecting coils are adjusted in a manner such that an influence by the earth's magnetic field in a setting state may be eliminated.

10. A display apparatus of a cathode ray tube comprising:

detecting means for detecting an amount of deviation of an image displayed on a screen of a cathode ray tube from a reference position on said screen, with the deviation being due to the geomagnetism, wherein said detecting means comprises a plurality of sensors; and means for adjusting a phase of a signal of display information for a synchronization signal of the cathode ray tube so that the display information is displayed at the reference position on said screen on the basis of the result of the detection by said detecting means.

11. A display apparatus according to claim 10, wherein said plurality of sensors are disposed on a peripheral portion of said screen.

12. A display apparatus according to claim 11, wherein said plurality of sensors are photosensors.

13. A display apparatus according to claim 6, wherein said detecting means comprises a plurality of sensors.

14. A display apparatus according to claim 13, wherein said plurality of sensors are disposed on a peripheral portion of said display apparatus.

15. A display apparatus according to claim 12, wherein said plurality of sensors are photosensors.

16. A display apparatus of a cathode ray tube type comprising:

horizontal and vertical deflecting coils arranged in a throat position of the display apparatus;

display information generating means for generating display information indicative of a pattern to be displayed for normal use or special display information indicative of a special pattern to be displayed;

vertical synchronization generating means, connected to a driver unit of said vertical deflecting coil, for generating a vertical synchronization signal for said display;

horizontal synchronization generating means, connected to a driver unit of said horizontal deflecting coil for generating a horizontal synchronization signal for said display;

detecting means for detecting a position in which the special pattern is displayed; and control means for controlling, upon a change in state in which said apparatus has been set into a lateral state or into a vertical long state, said display information generating means and said detecting means such that the special display information is generated and the display position of the special pattern is detected and controlling, in accordance with the display position of the special pattern detected by said detecting means, the vertical and horizontal synchronization signals such that the display position of the special pattern is adjusted.

17. A display apparatus according to claim 16, wherein the special pattern is a pattern indicative of a display size.

18. Q display apparatus according to claim 16, wherein said control means adjusts a phase of the special display information by shifting said phase for only a predetermined time for said vertical synchronization signal or said horizontal synchronization signal.

19. A display apparatus according to claim 16, wherein said detecting means comprises a plurality of sensors.

20. A display apparatus according to claim 19, wherein said plurality of sensors are disposed on a peripheral portion of said display apparatus.

* * * * *

UNITED STATES PATENT AND TRADEMARK OFFICE
CERTIFICATE OF CORRECTION

PATENT NO. : 5,021,720

DATED : June 4, 1991

INVENTOR(S) : Harutsugu Aimura

It is certified that error appears in the above-identified patent and that said Letters Patent is hereby corrected as shown below:

COLUMN 4:

Line 37, "sensors 2a to 2d light" should read --sensors 2a to 2d receive light--.

COLUMN 5:

Line 48, "on" should read --of--.

COLUMN 6:

Line 16, "steps" should read --step-- and "a" should be deleted.

Line 37, "special patter" should read --special pattern--.

Line 67, "synchorization" should read --synchronization--.

UNITED STATES PATENT AND TRADEMARK OFFICE
CERTIFICATE OF CORRECTION

PATENT NO. : 5,021,720

DATED : June 4, 1991

INVENTOR(S) : Harutsugu Aimura

It is certified that error appears in the above-identified patent and that said Letters Patent is hereby corrected as shown below:

COLUMN 8:

Line 1, "claim 12," should read --claim 14,--.

Line 36, "Q" should read --A--.

Signed and Sealed this

First Day of December, 1992

Attest:

DOUGLAS B. COMER

*Attesting Officer*   Acting Commissioner of Patents and Trademarks